US007239617B2

(12) United States Patent
Benco et al.

(10) Patent No.: US 7,239,617 B2
(45) Date of Patent: Jul. 3, 2007

(54) PER CALL INTERACTIVE HIGH SPEED PACKET DATA ACTIVATION

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 974 days.

(21) Appl. No.: 10/431,288

(22) Filed: May 7, 2003

(65) Prior Publication Data

US 2004/0223468 A1 Nov. 11, 2004

(51) Int. Cl.
*H04Q 7/00* (2006.01)

(52) U.S. Cl. ...................... 370/329; 370/341; 370/328; 455/450; 455/452.1; 709/203

(58) Field of Classification Search ................ 370/329, 370/341, 328; 455/450, 452.1; 709/203
See application file for complete search history.

(56) References Cited

U.S. PATENT DOCUMENTS

| | | | | |
|---|---|---|---|---|
| 5,734,646 | A * | 3/1998 | I et al. | 370/335 |
| 6,014,568 | A * | 1/2000 | Alperovich et al. | 455/456.3 |
| 6,064,662 | A * | 5/2000 | Gitlin et al. | 370/330 |
| 6,128,322 | A * | 10/2000 | Rasanen et al. | 370/536 |
| 6,424,636 | B1 * | 7/2002 | Seazholtz et al. | 370/295 |
| 7,116,985 | B2 * | 10/2006 | Wilson et al. | 455/456.1 |
| 2003/0045288 | A1 * | 3/2003 | Luschi et al. | 455/434 |
| 2003/0120705 | A1 * | 6/2003 | Chen et al. | 709/104 |

FOREIGN PATENT DOCUMENTS

| | | |
|---|---|---|
| WO | WO 00/69118 | 11/2000 |
| WO | WO 00/72572 | 11/2000 |
| WO | WO 02/102016 | 12/2002 |
| WO | WO 03/034667 | 4/2003 |

OTHER PUBLICATIONS

Dokko, et al., An Implementation of Prepaid Service in CDMA PCS System, 1999, pp. 265-269, LG Information & Communications, Ltd, Korea.

* cited by examiner

*Primary Examiner*—Danh Le

(57) ABSTRACT

The method and apparatus is for providing a mobile station in a telecommunication network with capability of activating a high speed packet data session without subscribing to a high speed packet data service and selecting a higher data rate than the rate it is currently subscribing to. In very general terms the method may have the steps of: activating, by a non high speed packet data subscribing mobile station, a high speed packet data service session with a mobile switching center that is currently operatively connected to the non-subscribing mobile station; allocating, by the mobile switching center, resources for the high speed packet data service session with the non high speed packet data subscribing mobile station; de-allocating, by the mobile switching center, after an end of the high speed packet data service session, the resources for the high speed packet data service session with the non high speed packet data subscribing mobile station; and sending, by the mobile switching center, after an end of the high speed packet data service session, the high speed packet data usage information to the charging system for billing.

17 Claims, 4 Drawing Sheets

PER CALL INTERACTIVE HIGH SPEED PACKET DATA ACTIVATION

TECHNICAL FIELD

The present invention relates to wireless telephony in general, and, more particularly, to a method and system for providing a mobile station with capability of activating a high speed packet data session without subscribing to a high speed packet data service and providing a mobile station with capability of selecting a higher connection speed than the speed that the mobile station is subscribing for a packet data session if a higher connection speed is available in the system.

BACKGROUND

Mobile data communications is rapidly becoming one of the fastest growing segments of the mobile communications market. A strong driving force is the fast growing portable computing market and the need for flexible wireless data communications it creates. This market force is further emphasized by the smaller, more personal oriented computing devices, such as Personal Digital Assistants (PDAs), and other so called palm top computing devices. With PDAs and other such personal computing devices, as well as with more conventional portable computers, it is possible to send and receive electronic mail, facsimiles, and even browse public information networks such as the World Wide Web. As these activities become popular for mobile equipment users, so too will the demand for mobile wireless data services.

At the same time, other types of mobile communications services are also in increased demand. These other services include mobile telephone interconnect service, such as cellular telephone, and dispatch radio service, for example. Typically these types of services are provided with separate equipment. That is, traditionally, dispatch and telephone interconnect systems have been separate systems, each requiring fixed and mobile equipment. However, there has been a move underway to provide multiple communications services to mobile users using common mobile and fixed equipment. These are referred to as integrated services radio networks. These systems use digital modulation for the radio channel, and are typically time division systems to allow multiple channels on a single frequency or pair of frequencies.

Mobile data service, or packet data, as it is sometimes referred, has been added to cellular telephone service such as GSM. However, to date, packet data service has not been made available commercially in integrated services radio networks. In doing so, a number of problems are presented, and chief among these is the registration of mobile subscriber units or mobile stations for packet data service.

In a typical communications equipment network a subscriber data base is maintained that includes provisioning information, feature activation status, and so forth This database is typically referred to as a home location register (HLR), and is well understood. Upon receiving a request for registration from a mobile station, the network equipment will access the HLR, find the correlating subscriber record, and determine what features to activate for the mobile station, as well as the necessary authentication information, among other pertinent information. This information is transferred to another database called the visit location register (VLR), which is also well understood in the art. The VLR is used by the system to also track the location in the system of the mobile station. That is, what particular cell or cells the mobile station was most recently in, so that an incoming call may be routed correctly.

In adding any service such as packet data service to a communications network, a VLR function is also necessary to track mobile stations within the serving area. This will allow the system to, for example, send notifiers that the system has received email for the mobile station. In an integrated services radio system, for example, a mobile station must register for packet data service.

However, there are situations when a mobile user, who is not registered for packet data service, desires to use the service on a one time, or occasional basis. Such casual mobile users do not want to pay the high price of subscribing to the high speed packet data service on a regular basis. There are also situations when a mobile user, who is registered for packet data service, desires to use a higher connection speed than the current connection speed that he or she is subscribing to. Therefore, there is a need in the prior art for a system that would allow packet data service or allow higher connection speed to mobile users only at a time they request it.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of an embodiment of the present method and system to provide a method and system for providing a mobile station with capability of activating a high speed packet data session without subscribing to a high speed packet data service.

It is a further aspect of an embodiment of the present method and system to provide a mobile station with a capability of activating high speed packet data service when the mobile user requests the service.

It is a further aspect of an embodiment of the present method and system to provide the capability of offering high speed packet data service session based on the real-time on-demand request by a mobile station.

One embodiment of the present method and apparatus is for providing a mobile station in a telecommunication network with capability of activating a high speed packet data session without subscribing to a high speed packet data service and selecting a higher data rate than the rate it is currently subscribing to. In very general terms the method in this embodiment has the steps of: activating, by a non high speed packet data subscribing mobile station, a high speed packet data service session with a mobile switching center that is currently operatively connected to the non high speed packet data subscribing mobile station; allocating, by the mobile switching center, resources for the high speed packet data service session with the non high speed packet data subscribing mobile station; de-allocating, by the mobile switching center, after an end of the high speed packet data service session, the resources for the high speed packet data service session with the non high speed packet data subscribing mobile station; and sending, by the mobile switching center, after an end of the high speed packet data service session, the high speed packet data usage information to the charging system for billing. The method also has the steps of selecting, by a high speed packet data subscribing mobile station a higher data rate than the rate it is currently subscribing to for a high speed packet data service session with the mobile switching center that is currently operatively connected to the high speed packet data subscribing mobile station; allocating, by the mobile switching center, resources for the higher data rate packet data service session with the high speed packet data subscribing mobile station; de-allocating, by the mobile switching center, after an end of the high speed packet data service session, the resources for the high speed packet data service session with the high speed packet data subscribing mobile station; and sending, by the mobile switching center, after an end of the high speed packet data service session, the high speed packet data usage information to the charging system for billing.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

Figure 1:
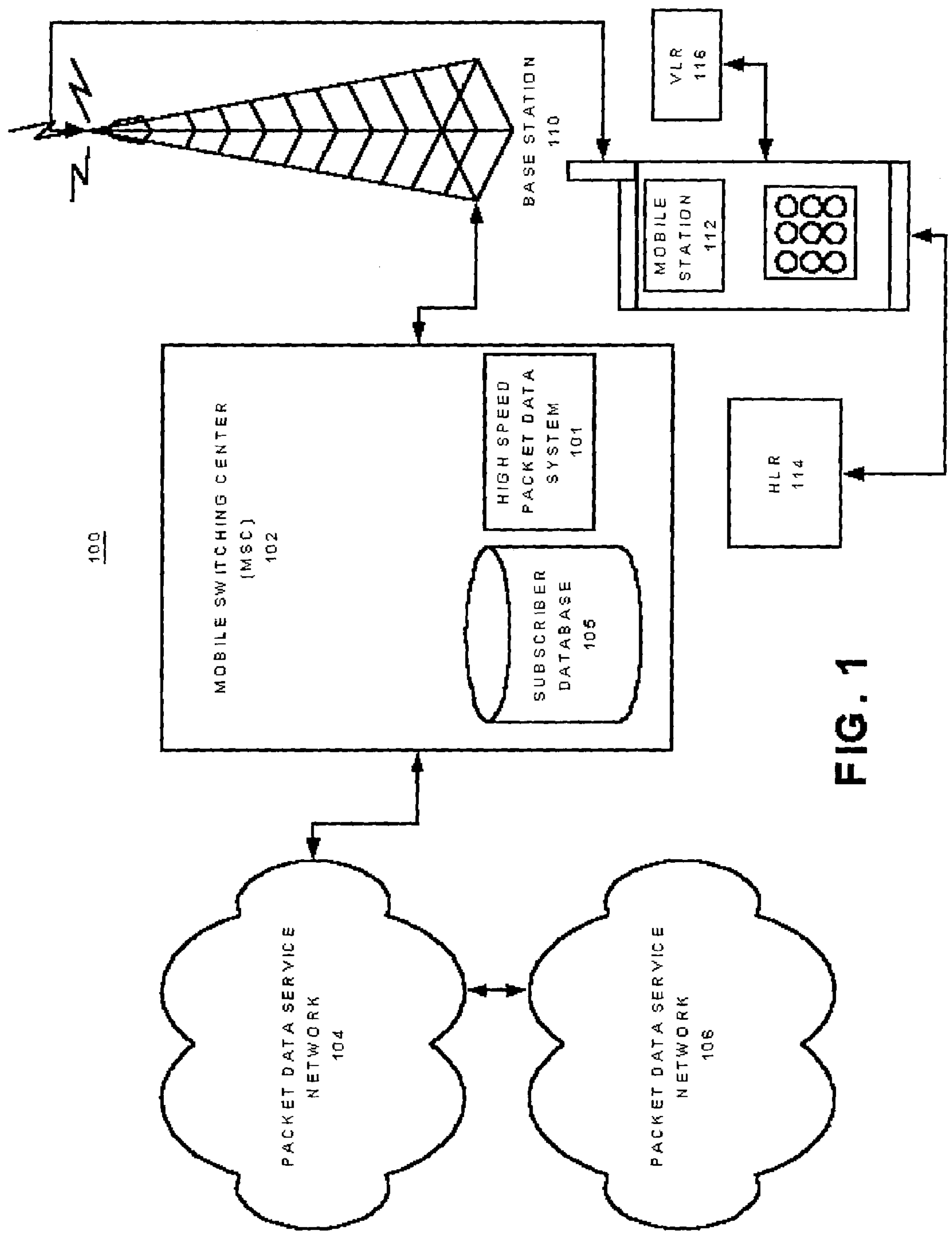
FIG. 1 depicts a block diagram illustrative of a mobile switching center, base station and mobile station for use with the present method and system.

The particular values and configurations discussed in these non-limiting examples can be varied and are cited merely to illustrate an embodiment of the present invention and are not intended to limit the scope of the invention.

The GSM network can be divided into three broad parts. The Mobile Station is carried by the subscriber. The Base Station Subsystem controls the radio link with the Mobile Station. The Network Subsystem, the main part of which is the Mobile services Switching Center (MSC), performs the switching of calls between the mobile users, and between mobile and fixed network users.

The mobile station (MS) consists of the mobile equipment (the terminal) and a smart card called the Subscriber Identity Module (SIM). The SIM provides personal mobility, so that the user can have access to subscribed services irrespective of a specific terminal. By inserting the SIM card into another GSM terminal, the user is able to receive calls at that terminal, make calls from that terminal, and receive other subscribed services.

The International Mobile Equipment Identity (IMEI) uniquely identifies the mobile equipment. The SIM card contains the International Mobile Subscriber Identity (IMSI) used to identify the subscriber to the system, a secret key for authentication, and other information. The IMEI and the IMSI are independent, thereby allowing personal mobility. The SIM card may be protected against unauthorized use by a password or personal identity number.

The Base Station Subsystem is composed of two parts, the Base Transceiver Station (BTS) and the Base Station Controller (BSC). These communicate across the standardized Abis interface, allowing (as in the rest of the system) operation between components made by different suppliers. The Base Transceiver Station houses the radio transceivers that define a cell and handles the radio-link protocols with the Mobile Station. In a large urban area, there will potentially be a large number of BTSs deployed, thus the requirements for a BTS are ruggedness, reliability, portability, and minimum cost. The Base Station Controller manages the radio resources for one or more BTSs. It handles radio-channel setup, frequency hopping, and handovers, as described below. The BSC is the connection between the mobile station and the Mobile service Switching Center (MSC).

The central component of the Network Subsystem is the Mobile services Switching Center (MSC). It acts like a normal switching node of the PSTN or ISDN, and additionally provides all the functionality needed to handle a mobile subscriber, such as registration, authentication, location updating, handovers, and call routing to a roaming subscriber. These services are provided in conjunction with several functional entities, which together form the Network Subsystem. The MSC provides the connection to the fixed networks (such as the PSTN or ISDN). Signaling between functional entities in the Network Subsystem uses Signaling System Number 7 (SS7), used for trunk signaling in ISDN and widely used in current public networks.

The Home Location Register (HLR) and Visitor Location Register (VLR), together with the MSC, provide the call-routing and roaming capabilities of GSM. The HLR contains all the administrative information of each subscriber registered in the corresponding GSM network, along with the current location of the mobile. The location of the mobile is typically in the form of the signaling address of the VLR associated with the mobile station. The actual routing procedure will be described later. There is logically one HLR per GSM network, although it may be implemented as a distributed database.

The Visitor Location Register (VLR) contains selected administrative information from the HLR, necessary for call control and provision of the subscribed services, for each mobile currently located in the geographical area controlled by the VLR. Although each functional entity can be implemented as an independent unit, all manufacturers of switching equipment to date implement the VLR together with the MSC, so that the geographical area controlled by the MSC corresponds to that controlled by the VLR, thus simplifying the signaling required.

The other two registers are used for authentication and security purposes. The Equipment Identity Register (EIR) is a database that contains a list of all valid mobile equipment on the network, where each mobile station is identified by its International Mobile Equipment Identity (IMEI). An IMEI is marked as invalid if it has been reported stolen or is not type approved. The Authentication Center (AuC) is a protected database that stores a copy of the secret key stored in each subscriber's SIM card, which is used for authentication and encryption over the radio channel.

A powered-on mobile is informed of an incoming call by a paging message sent over the PAGCH channel of a cell. One extreme would be to page every cell in the network for each call, which is obviously a waste of radio bandwidth. The other extreme would be for the mobile to notify the system, via location updating messages, of its current location at the individual cell level. This would require paging messages to be sent to exactly one cell, but would be very wasteful due to the large number of location updating messages. A compromise solution used in GSM is to group cells into location areas. Updating messages are required when moving between location areas, and mobile stations are paged in the cells of their current location area.

The location updating procedures, and subsequent call routing, use the MSC and two location registers: the Home Location Register (HLR) and the Visitor Location Register (VLR). When a mobile station is switched on in a new location area, or it moves to a new location area or different operator's PLMN, it must register with the network to indicate its current location. In the normal case, a location update message is sent to the new MSC/VLR, which records the location area information, and then sends the location information to the subscriber's HLR. The information sent to the HLR is normally the SS7 address of the new VLR, although it may be a routing number. The reason a routing number is not normally assigned, even though it would reduce signaling, is that there is only a limited number of routing numbers available in the new MSC/VLR and they are allocated on demand for incoming calls. If the subscriber is entitled to service, the HLR sends a subset of the subscriber information, needed for call control, to the new MSC/VLR, and sends a message to the old MSC/VLR to cancel the old registration.

For reliability reasons, GSM also has a periodic location updating procedure. If an HLR or MSC/VLR fails, to have each mobile register simultaneously to bring the database up to date would cause overloading. Therefore, the database is updated as location-updating events occur. The enabling of periodic updating, and the time period between periodic updates, is controlled by the operator, and is a trade-off between signaling traffic and speed of recovery. If a mobile does not register after the updating time period, it is deregistered.

In some situations, there are mobile users who are not subscribing to the high speed packet data service and would like to have the service just for some certain time that they need it, for example, an immediate need to download a large file for a meeting. Such casual users probably do not want to pay the high price of subscribing to the high speed packet data service on a regular basis. Instead, they would prefer having the service just at the time they request it.

With the present method and system, the mobile user, in one embodiment may request a high speed packet data session, for example, by pressing a button or clicking an icon on a mobile station, such as a cell phone. The mobile station may then send a request to the network, which will then activate the high speed packet data service just for one session for this mobile user.

The casual users will be able to use the high speed packet data services without having a contract with service providers, thus avoiding the high monthly service charge. This is also a benefit to service providers, since this capability will likely to bring in more revenue from casual users since it opens the door for mobile users to activate the service without subscription, and the per call charge usually is more expensive than the monthly subscription charge.

In some other situations, there are mobile users who are subscribing to the high speed packet data service and would like to have a higher connection speed than the one they are subscribing to just for some certain time that they need it, for example, an immediate need to download a large file for a meeting in a short period of time. Such users would prefer having the higher connection speed for the service just at the time they request it.

When a mobile station (or other wireless device) user presses an activation button or clicks on a high speed packet data service icon on the device, the mobile station, cell phone, or other device will send a command to the network requesting a high speed packet data service session. The network will query the subscriber's database for information. If the subscriber does not currently subscribe to the packet data service, then it will first enable the packet data service. The network will then send back the available choices, in the system, for example, 153.5 kbps, 307.2 kbps or "best available", "most economic", "don't care", etc. for the user to choose if there is more than one connection speed that is applicable. If the subscriber already subscribes to the packet data service, then the network will send back the various data rates that are available in the system, including all higher connection speeds that are available for the user to choose from. The user may choose a higher rate one than he/she is currently subscribing to. After the high speed packet data session ends, the network will then de-allocate all the resources for the session and the usage information, for example, connection speed, bytes transmitted/received or time period will be sent to the charging center for billing.

The present method and apparatus provides a mobile station in a telecommunication network with the capability of activating a high speed packet data session without subscribing to a high speed packet data service and allows a packet data subscriber to choose a higher rate than the one that he/she is currently subscribing to. In very general terms the method has the steps of: activating, by a non-subscribing mobile station, a high speed packet data service session with a mobile switching center that is currently operatively connected to the non-subscribing mobile station; and allocating, by the mobile switching center, resources for the high speed packet data service session with the non-subscribing mobile station. The method also has the steps of: selecting, by a subscribing mobile station, a higher data rate than it is currently subscribing to for a packet data service session with a mobile switching center that is currently operatively connected to the subscribing mobile station; and allocating, by the mobile switching center, resources for the higher connection speed of a packet data service session with the subscribing mobile station.

Referring to FIG. 1, a system 100 is depicted for use with the present method and system. System 100 has a mobile switching center (MSC) 102. The system may be, or may be part of, one or more of a telephone network, a local area network ("LAN"), the Internet, and a wireless network. In the depicted embodiment, a packet data service network (PDSN) 104 is connected to MSC 102. The PDSN 104 routes packet data calls to and from mobile users through the MSC 102. The PDSN104 also routes packet data calls from and to other packet data service networks 106. The MSC 102 is also connected to one or more base stations (BS) 110. Each of the base stations 110 communicates with mobile station(s) 112 in its service area. The PDSN 104 generally can be implemented as the worldwide IP network accessible to all those with IP network access privileges.

Each of the mobile stations 112 has a home location register (HLR) 114 where data about each of the mobile stations 112 resides. Some of the mobile stations 112 may be remotely located from their home location, and in that case, a visiting location register (VLR) 116 is set up locally for each mobile station 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 can be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, can be implemented as a local database maintained by the cellular provider whose territory is being roamed. Mobile station 112 can be implemented as a cellular device, personal communication device, short message service device or wireless communications device (e.g., a wireless personal digital assistant).

The MSC 102 may also have a subscriber database 105. Furthermore, the MSC 102 may have, or be operatively connected to, a high speed packet data system 101 that provides high speed data transfer between the MSC 102 and the mobile station.

Figure 2:
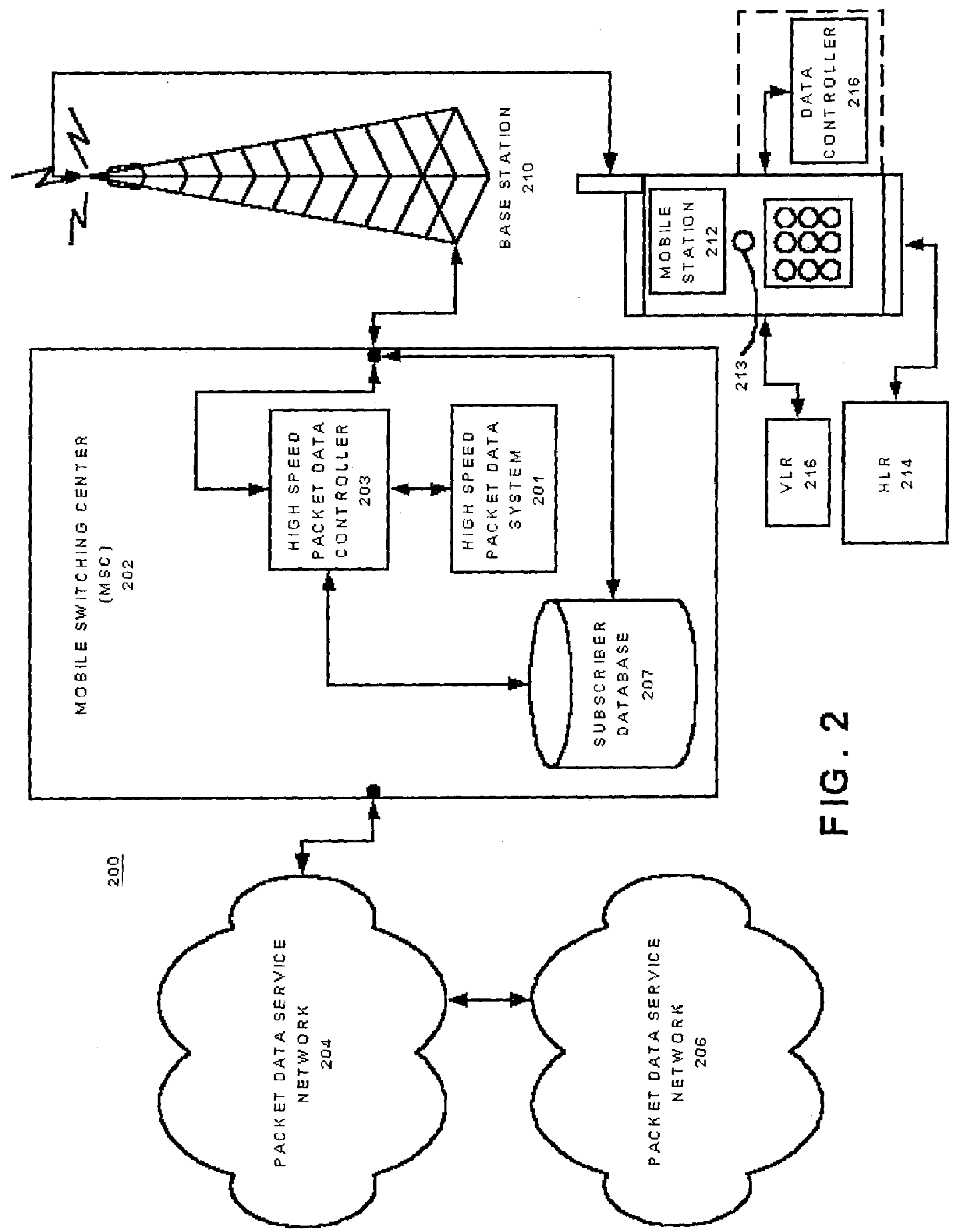
FIG. 2 illustrates a more detailed block diagram illustrative of a mobile switching center, base station, and mobile station according to one embodiment of the present method and system.

Referring to FIG. 2, a system 200 is shown in more detail for providing a mobile station in a telecommunication network with capability of activating a high speed packet data session without subscribing to a high speed packet data service and enabling a higher connection speed than the one that a mobile user is subscribing to for a packet data session. FIG. 2 depicts a block diagram that is illustrative of a mobile switching center 202 operatively connected to a PDSN 204, base station 210, and mobile station 212 according to one embodiment of the present method and system. The PDSN 204 routes packet data calls to and from mobile users through the MSC 202, as well as routing packet data calls from and to other packet data service networks 206. The MSC 202 is connected to one or more base stations 210. The base station(s) 210 communicates through the air to mobile stations 212, which may be of a cellular telephone type or of the wider bandwidth personal communication device type. Mobile stations 212 may be wireless handsets or automobile mounted stations the same as those shown in FIG. 1.

The mobile station 212 has a request system that, upon being activated, outputs a request message to the mobile switching center 202 that is currently operatively connected to the subscribing mobile station 212. The activating system may have an activating device 213 operatively connected to a data controller 216, wherein, upon activation of the activating device 213, the data controller 216 in the mobile station 212 communicates with a high speed packet data controller 203 in the mobile switching center 202.

The high speed packet data controller 203 in the mobile switching center 202 receives the request message form the mobile station 212. A subscriber database 207 has data indicative of the mobile station being one of a subscribing mobile station and non-subscribing mobile station, the subscriber database 207 is operatively connected to the mobile switching center 202. A high speed packet data system 201 is also operatively connected to the high speed packet data controller 203 in the mobile switching center 202. The high speed packet data controller 203 queries the subscriber database 207 for the mobile subscriber's high speed packet data subscribing data. A non high speed packet data subscribing mobile station, for example mobile station 212 activates a high speed packet data service session in the mobile switching center 202 upon sending a request message thereto, whereupon, in response to the request message, the mobile switching center 202, allocates resources for the high speed packet data service session for the high speed packet data system 201 with the non-subscribing mobile station 212. In the case of a high speed packet data subscribing mobile station, for example mobile station 212 selects a higher rate one than it is currently subscribing to for a packet data service session in the mobile switching center 202 upon sending a request message thereto, whereupon, in response to the request message, the mobile switching center 202, allocates resources for the packet data service session with a higher connection speed for the high speed packet data system 201 with the subscribing mobile station 212.

The high speed packet data system 201 may have a plurality of connection speeds for use in high speed packet data service session with the mobile station 212. The available connection speeds may be, for example, 153.5 kbps, 307.2 kbps, etc. The available connection speeds may also be, for example, at least one of "best available" connection speed, "most economic" connection speed, and "don't care" connection speed.

The high speed packet data system 201 receives the request from the high speed packet data controller 203. The system enables the packet data connection session and sends the connection information to the high speed packet data controller 203.

The high speed packet data controller communicates with the data controller 216 in the mobile station 212 and sends the enabling and connection information to the data controller 216.

The data controller 216 communicates and receives the enabling and connection information from the high speed packet data controller 203 and establishes a high speed packet data session for the mobile station 212 with the high speed packet data system 201.

Figure 3:
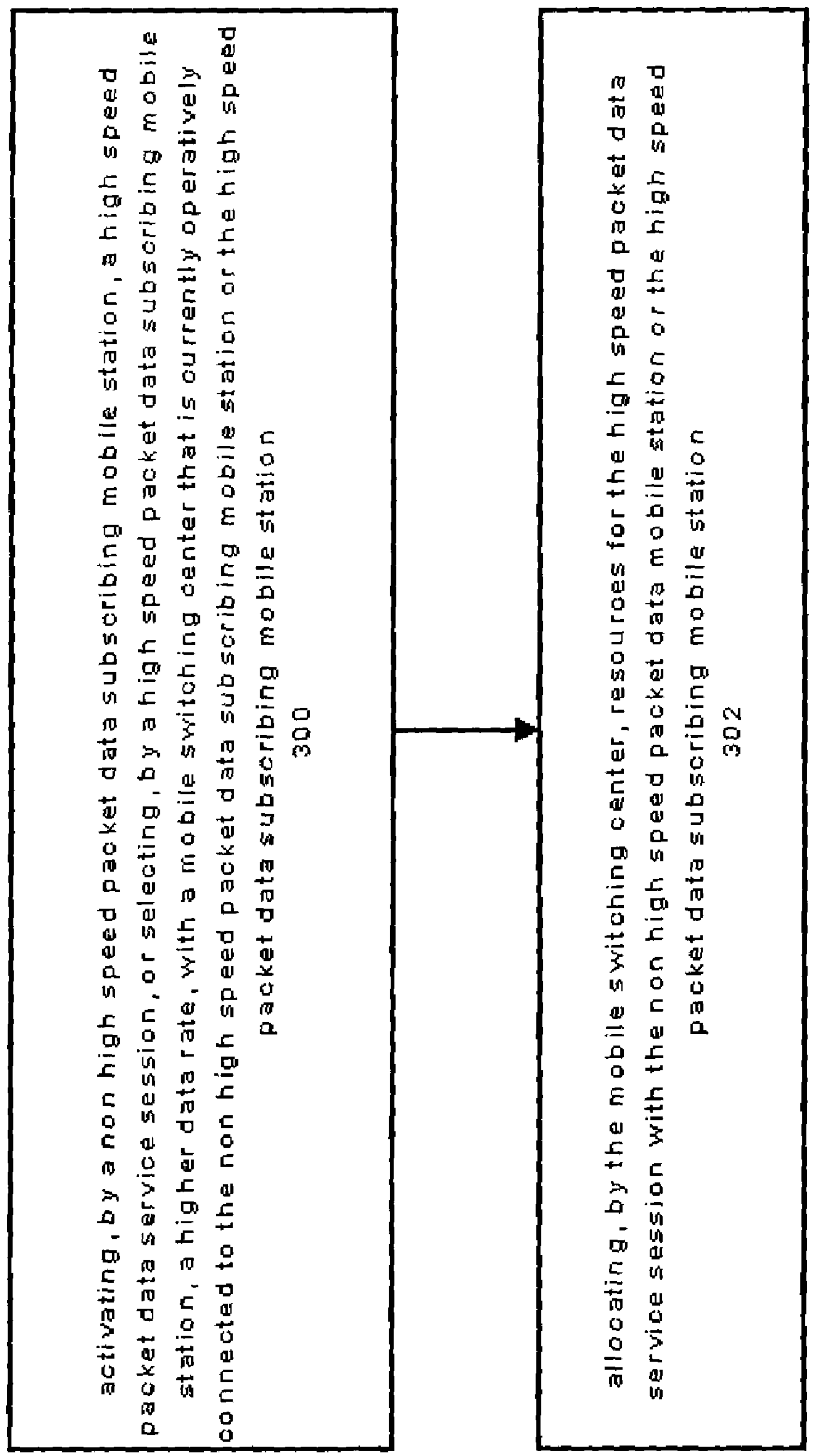
FIG. 3 illustrates a very general flow chart of logical operational steps that may be followed in accordance with one embodiment of the present method and system.

FIG. 3 is a block diagram depicting an embodiment of the present method for providing a mobile station in a telecommunication network with capability of activating a high speed packet data session without subscribing to a high speed packet data service and allowing a packet data subscribing mobile station of selecting a higher data rate than the one it is currently subscribing to. In very general terms the method has the steps of: activating, by a non high speed packet data subscribing mobile station, a high speed packet data service session with a mobile switching center that is currently operatively connected to the non-subscribing mobile station (step 300); and allocating, by the mobile switching center, resources for the high speed packet data service session with the non high speed packet data subscribing mobile station (step 302). The method also has the steps of: selecting, by a high speed packet data subscribing mobile station, a higher data rate for a packet data service session with a mobile switching center that is currently operatively connected to the high speed packet data subscribing mobile station (step 300); and allocating, by the mobile switching center, resources for the higher connection speed of a packet data service session with the high speed packet data subscribing mobile station (step 302).

Figure 4:
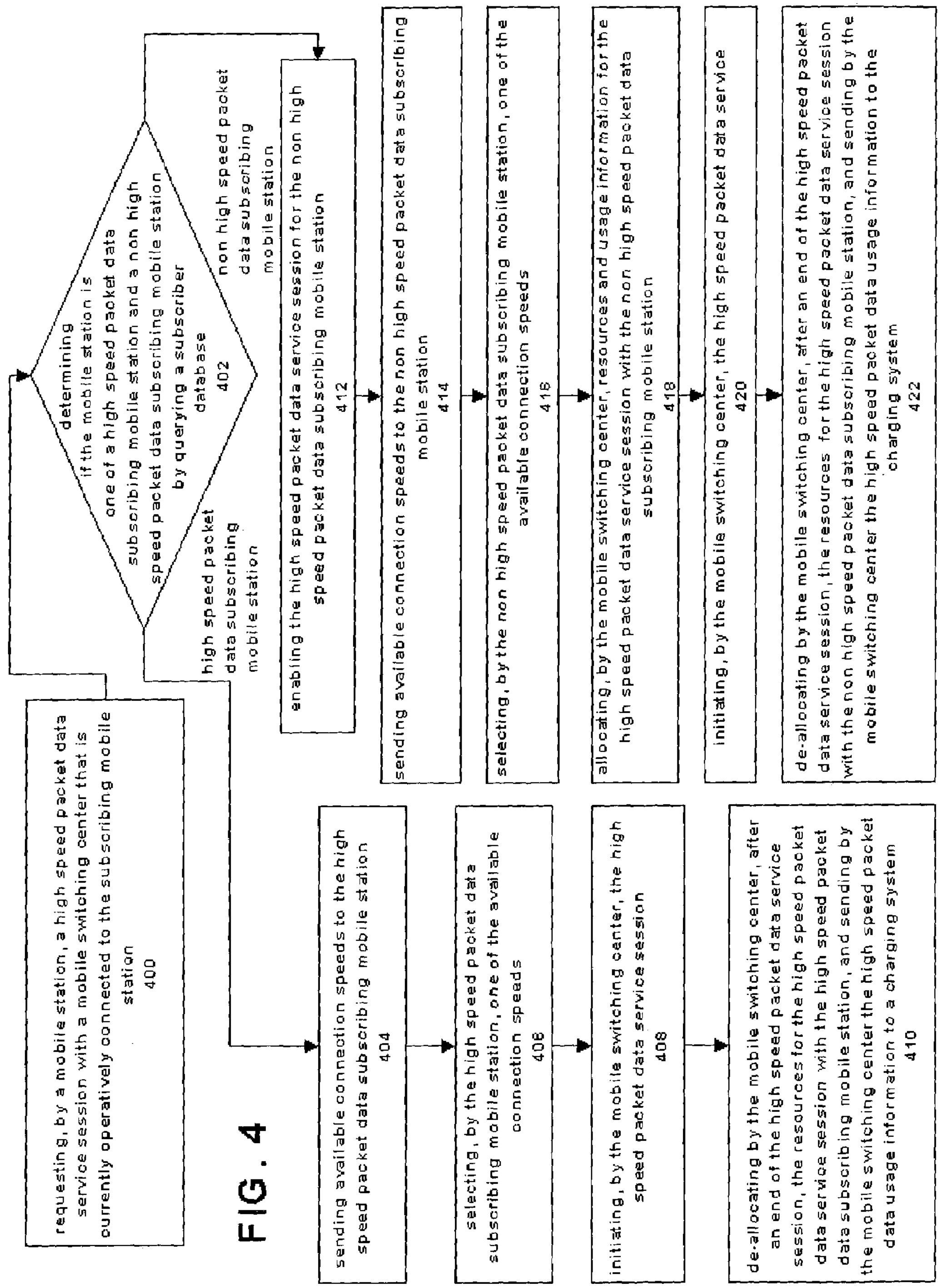
FIG. 4 illustrates a more detailed flow chart of logical operational steps that may be followed in accordance with one embodiment of the present method and system.

FIG. 4 is a block diagram depicting another embodiment of the present method. This embodiment of the method in a telecommunications network has the steps of: requesting, by a mobile station, a high speed packet data service session with a mobile switching center that is currently operatively connected to the subscribing mobile station (step 400); determining if the mobile station is one of a high speed packet data subscribing mobile station and a non high speed packet data subscribing mobile station querying a subscriber database (step 402); when the mobile station is a high speed packet data subscribing mobile station, sending available connection speeds including all higher connection speeds that are available to the high speed packet data subscribing mobile station (step 404), selecting, by the high speed packet data subscribing mobile center, one of the available connection speeds (step 406), initiating, by the mobile switching center, the high speed packet data service session (step 408), de-allocating by the mobile switching center, after an end of the high speed packet data service session, the resources for the high speed packet data service session with the high speed packet data subscribing mobile station, and sending the packet data usage information to the charging system for billing (step 410); when the mobile station is a non high speed packet data subscribing mobile station, enabling the high speed packet data service session for the non high speed packet data subscribing mobile station (step 412), sending available connection speeds to the non high speed packet data subscribing mobile station (step 414), selecting, by the non high speed packet data subscribing mobile center, one of the available connection speeds (step 416), allocating, by the mobile switching center, resources for the high speed packet data service session with the non high speed packet data subscribing mobile station (step 418), initiating, by the mobile switching center, the high speed packet data service (step 420) session, de-allocating by the mobile switching center, after an end of the high speed packet data service session, the resources for the high speed packet data service session with the non high speed packet data subscribing mobile station an sending the packet data usage information to the charging system for billing (step 422).

The present system and method may be used with non-mobile phones, as well as, mobile phones.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art. For example, the mobile phone data controller in the mobile station and the high speed packet data controller in the mobile switching center may be implemented in software.

Therefore, embodiments of the present method and system overcome the drawbacks of the prior art and provide a method and system that allows packet data service to mobile users only at a time they request it.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for providing a mobile station in a telecommunication network with capability of activating a high speed packet data session without subscribing to a high speed packet data service and selecting a higher data rate than the rate that it is currently subscribing to for a high speed packet data session, said method comprising the steps of:

activating, by a non high speed packet data subscribing mobile station, a high speed packet data service session with a mobile switching center that is currently operatively connected to the non high speed packet data subscribing mobile station;

allocating, by the mobile switching center, resources for the high speed packet data service session with the non high speed packet data subscribing mobile station; and allocating, by the mobile switching center, resources for a higher data rate than a subscribed one for a packet data service session with a high speed packet data subscribing mobile station.

2. The method of claim 1 further comprising the step of offering, by the mobile switching center, available connection speeds to the non high speed packet data subscribing mobile station as well as to the high speed packet data subscribing mobile station.

3. The method of claim 2 wherein the available connection speeds comprises at least one of the available connection speeds that the system supports or at least one of connection speed categories defined in the system.

4. The method of claim 2 further comprising the steps of: selecting, by the non high speed packet data subscribing mobile center and the high speed packet data subscribing mobile station, one of the available connection speeds; and initiating, by the mobile switching center, the high speed packet data service session.

5. The method of claim 1 further comprising the step of de-allocating by the mobile switching center, after an end of the high speed packet data service session, the resources for the high speed packet data service session with the non high speed packet data subscribing mobile station and the high speed packet data subscribing mobile station.

6. A method for providing a mobile station in a telecommunication network with capability of activating a high speed packet data session without subscribing to a high speed packet data service and enabling a higher data rate connection than the rate that the mobile station is currently subscribing to, said method comprising the steps of:

requesting, by a mobile station, a high speed packet data service session with a mobile switching center that is currently operatively connected to the subscribing mobile station;

determining if the mobile station is one of a high speed packet data subscribing mobile station and a non-subscribing mobile station;

when the mobile station is a high speed packet data subscribing mobile station, sending available connection speeds including all higher connection speeds that are available to the high speed packet data subscribing mobile station, selecting, by the high speed packet data subscribing mobile center, one of the available connection speeds, initiating, by the mobile switching center, the high speed packet data service session, de-allocating by the mobile switching center, after an end of the high speed packet data service session, the resources for the high speed packet data service session with the high speed packet data subscribing mobile station, and sending by the mobile switching center, after an end of the high speed packet data service session, the connection speed and the packet data usage information to the charging system for billing;

when the mobile station is a non high speed packet data subscribing mobile station, enabling the high speed packet data service session for the non high speed packet data subscribing mobile station, sending available connection speeds to the non high speed packet data subscribing mobile station, selecting, by the non high speed packet data subscribing mobile center, one of the available connection speeds, allocating, by the mobile switching center, resources for the high speed packet data service session with the non high speed packet data subscribing mobile station, initiating, by the mobile switching center, the high speed packet data service session, de-allocating by the mobile switching center, after an end of the high speed packet data service session, the resources for the high speed packet data service session with the non high speed packet data subscribing mobile station, and sending by the mobile switching center, after an end of the high speed packet data service session, the connection speed and the packet data usage information to a charging system for billing.

7. The method of claim 6 wherein the available connection speeds comprises at least one of available connection speeds that the system supports or at least one of connection speed categories defined by the system.

8. The method of claim 6 further comprises in the step of determining if the mobile station is one of a high speed packet data subscribing mobile station and a non high speed packet data subscribing mobile station; querying the subscriber database.

9. A system for providing a mobile station in a telecommunication network with capability of activating a high speed packet data session with a mobile switching center without subscribing to a high speed packet data service and selecting a higher data rate than the rate it is currently subscribing to, said system comprising:

a mobile station having a request system, the request system, upon being activated, outputting a request message to a mobile switching center that is currently operatively connected to the subscribing mobile station;

the mobile switching center having a high speed packet data controller that receives the request message;

a subscriber database having data indicative of the mobile station being one of a high speed packet data subscribing mobile station and non high speed packet data subscribing mobile station, the subscriber database operatively connected to the mobile switching center;

a high speed packet data system operatively connected to the high speed packet data controller in the mobile switching center;

wherein the non high speed packet data subscribing mobile station activates a high speed packet data service session with a mobile switching center upon sending a request message thereto; and wherein, in response to the request message, the mobile switching center, allocates resources for the high speed packet data service session with the non high speed packet data subscribing mobile station, and wherein the high speed packet data subscribing mobile station selects a higher connection speed for packet data service session with a mobile switching center upon sending a request message thereto; and wherein, in response to the request message, the mobile switching center, allocates resources for the higher connection speed of a packet data service session with the subscribing mobile station.

10. The system of claim 9 further comprising a plurality of connection speeds for use in high speed packet data service session.

11. The system of claim 10 wherein the available connection speeds comprises at least one of available connection speeds that the system supports or at least one of connection speed categories defined in the system.

12. The system of claim 9 wherein the request system in the mobile station comprises an activating device operatively connected to a data controller, wherein, upon activation of the activating device, the data controller in the mobile station communicates with the high speed packet data controller in the mobile switching center.

13. A method for providing a mobile station in a telecommunication network with capability of activating a high speed packet data session without subscribing to a high speed packet data service and selecting a higher data rate than the rate that it is currently subscribing to for a high speed packet data session, said method comprising the steps of:

activating, by a non high speed packet data subscribing mobile station, a high speed packet data service session with a mobile switching center that is currently operatively connected to the non high speed packet data subscribing mobile station;

allocating, by the mobile switching center, resources for the high speed packet data service session with the non high speed packet data subscribing mobile station;

selecting, by a high speed packet data subscribing mobile station, a higher connection speed for packet data service session with a mobile switching center upon sending a request message thereto; and allocating, by the mobile switching center, resources for a higher data rate than a subscribed one for a packet data service session with the high speed packet data subscribing mobile station.

14. The method of claim 13 further comprising the step of offering, by the mobile switching center, available connection speeds to the non high speed packet data subscribing mobile station as well as to the high speed packet data subscribing mobile station.

15. The method of claim 14 wherein the available connection speeds comprises at least one of the available connection speeds that the system supports or at least one of connection speed categories defined in the system.

16. The method of claim 14 further comprising the steps of: selecting, by the non high speed packet data subscribing mobile center and the high speed packet data subscribing mobile station, one of the available connection speeds; and initiating, by the mobile switching center, the high speed packet data service session.

17. The method of claim 13 further comprising the step of de-allocating by the mobile switching center, after an end of the high speed packet data service session, the resources for the high speed packet data service session with the non high speed packet data subscribing mobile station and the high speed packet data subscribing mobile station.

* * * * *